(12) United States Patent
Sun et al.

(10) Patent No.: US 10,175,548 B2
(45) Date of Patent: Jan. 8, 2019

(54) DISPLAY DEVICE, MANUFACTURING METHOD THEREOF, DRIVING METHOD THEREOF, AND DISPLAY APPARATUS

(71) Applicant: BOE TECHNOLOGY GROUP CO., LTD., Beijing (CN)

(72) Inventors: Xuefei Sun, Beijing (CN); Zhengliang Li, Beijing (CN); Zhanfeng Cao, Beijing (CN); Xiangchun Kong, Beijing (CN); Qi Yao, Beijing (CN); Jincheng Gao, Beijing (CN); Feng Guan, Beijing (CN); Xiaolong He, Beijing (CN); Bin Zhang, Beijing (CN); Wei Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 189 days.

(21) Appl. No.: 15/086,933

(22) Filed: Mar. 31, 2016

(65) Prior Publication Data

US 2016/0349589 A1 Dec. 1, 2016

(30) Foreign Application Priority Data

May 25, 2015 (CN) .......................... 2015 1 0272138

(51) Int. Cl.
*G02F 1/157* (2006.01)
*G09G 3/38* (2006.01)
(Continued)

(52) U.S. Cl.
CPC .......... *G02F 1/157* (2013.01); *G09G 3/2003* (2013.01); *G09G 3/3433* (2013.01); *G09G 3/38* (2013.01);
(Continued)

(58) Field of Classification Search
CPC .......... G02F 1/157; G02F 1/153; G02F 1/155; G02F 1/163; G02F 1/1523; G02F 1/1521;
(Continued)

(56) References Cited

U.S. PATENT DOCUMENTS 5,585,958 A * 12/1996 Giraud .................... G02F 1/155
 359/265
6,011,642 A * 1/2000 Vink ...................... G02F 1/1523
 204/192.26
(Continued)

FOREIGN PATENT DOCUMENTS

CN 1426543 A 6/2003
CN 1981317 A 6/2007
(Continued)

OTHER PUBLICATIONS

Chinese Office Action in Chinese Application No. 201510272138.1, dated Apr. 28, 2017 with English translation.
(Continued)

*Primary Examiner* — Fred Tzeng
(74) *Attorney, Agent, or Firm* — Collard & Roe, P.C.

(57) ABSTRACT

A display device, a manufacturing method thereof, a driving method thereof and a display apparatus. The display device includes: a display panel; and an electrochromic device located on a light exiting side of the display panel. The electrochromic device and the display panel share a first base substrate and a first transparent electrode in the display panel that are close to the light exiting side of the display panel.

17 Claims, 9 Drawing Sheets

(51) Int. Cl.
*G09G 3/20* (2006.01)
*G09G 3/34* (2006.01)
*G02F 1/155* (2006.01)
*G02F 1/163* (2006.01)
*G09G 3/32* (2016.01)
*G09G 3/36* (2006.01)

(52) U.S. Cl.
CPC .............. *G02F 1/155* (2013.01); *G02F 1/163* (2013.01); *G02F 2201/44* (2013.01); *G09G 3/32* (2013.01); *G09G 3/36* (2013.01); *G09G 2300/023* (2013.01); *G09G 2300/04* (2013.01)

(58) Field of Classification Search
CPC ... G02F 1/1335; G02F 1/1368; G09G 3/2003; G09G 3/2085; G09G 3/3433; G09G 3/3696; G09G 3/3648
USPC ......................................................... 345/697
See application file for complete search history.

(56) References Cited

U.S. PATENT DOCUMENTS

| | | | |
|---|---|---|---|
| 6,992,808 | B2 | 1/2006 | Shinozaki et al. |
| 2005/0275923 | A1* | 12/2005 | Park .................. G02F 1/155 359/270 |
| 2008/0238828 | A1 | 10/2008 | Nakayama et al. |
| 2008/0304131 | A1 | 12/2008 | Nguyen |
| 2012/0044561 | A1* | 2/2012 | Yeh .................... G02F 1/1521 359/268 |
| 2013/0341659 | A1* | 12/2013 | Lin ..................... G02F 1/157 257/91 |
| 2014/0085578 | A1 | 3/2014 | Gu et al. |
| 2014/0168745 | A1* | 6/2014 | Satou .................. G02F 1/163 359/266 |
| 2015/0067392 | A1* | 3/2015 | Lim ..................... G06F 1/12 714/15 |
| 2015/0103104 | A1* | 4/2015 | Lee .................... G09G 3/3648 345/690 |
| 2015/0108508 | A1* | 4/2015 | Wu ..................... G02F 1/157 257/84 |
| 2015/0160525 | A1* | 6/2015 | Shi ...................... G02F 1/155 359/275 |
| 2015/0179139 | A1* | 6/2015 | Watanabe ............ G09F 9/33 345/592 |
| 2015/0213751 | A1* | 7/2015 | Lee .................... G09G 3/2085 345/212 |
| 2015/0213779 | A1* | 7/2015 | Baek ................... G09G 5/008 345/204 |
| 2015/0310812 | A1* | 10/2015 | Chen ................... G09G 3/3696 345/691 |
| 2015/0325200 | A1* | 11/2015 | Rho .................... G09G 3/20 345/212 |
| 2016/0011428 | A1* | 1/2016 | Li ...................... G02B 27/2214 359/275 |
| 2016/0033842 | A1* | 2/2016 | Shi ...................... G02F 1/153 359/275 |

FOREIGN PATENT DOCUMENTS

| | | |
|---|---|---|
| CN | 1989445 A | 6/2007 |
| CN | 102338960 A | 2/2012 |
| CN | 102879946 A | 1/2013 |
| CN | 104122671 A | 10/2014 |
| JP | 2000-214330 A | 8/2000 |

OTHER PUBLICATIONS

Second Chinese Office Action in Chinese Application No. 201510272138.1, dated Sep. 26, 2017 with English translation.

* cited by examiner

DISPLAY DEVICE, MANUFACTURING METHOD THEREOF, DRIVING METHOD THEREOF, AND DISPLAY APPARATUS

CROSS REFERENCE TO RELATED APPLICATIONS

Applicant claims priority under 35 U.S.C. § 119 of Chinese Application No. 201510272138.1 filed on May 25, 2015, the disclosure of which is incorporated by reference.

TECHNICAL FIELD

The present disclosure relates to a display device, a manufacturing method thereof, a driving method thereof and a display apparatus.

BACKGROUND

Electrochromism can be used as a new display technology, and is mainly applied in glass show windows, billboards, transparent displays and other aspects. Electrochromism refers to a phenomenon that under an action of an external electric field, optical properties of an electrochromic material experiences a stable and reversible color change. In appearance, electrochromism is manifested by a reversible change between displaying a certain color and displaying a transparent color.

SUMMARY

Embodiments of the present disclosure provide a display device, which includes: a display panel; and an electrochromic device located on a light exiting side of the display panel. The electrochromic device and the display panel share a first base substrate and a first transparent electrode of the display panel, where the first base substrate and the first transparent electrode of the display panel are close to the light exiting side of the display panel.

Embodiments of the present disclosure also provide a display apparatus, which includes the above-described display device.

Embodiments of the present disclosure also provide a manufacturing method of the display device. The manufacturing method includes: forming the electrochromic device at the light exiting side of the display panel, where the electrochromic device and the display panel share the first base substrate and the first transparent electrode in the display panel that are close to the light exiting side of the display panel.

Embodiments of the present disclosure also provide a driving method of the display device. The driving method includes:

when the display panel is in a display state, applying different voltage signals to a second transparent electrode in the electrochromic device and the first transparent electrode in the display panel that is close to the light exiting side of the display panel, so that the electrochromic device shows a transparent color at least in a display region of the display panel; and when the display panel is in a non-display state, applying different voltage signals to the second transparent electrode in the electrochromic device and the first transparent electrode in the display panel that is close to the light exiting side of the display panel, so that the electrochromic device displays an image.

BRIEF DESCRIPTION OF THE DRAWINGS

In order to clearly illustrate the technical solutions of the embodiments of the disclosure or the technical solutions of the existing technology, the drawings used in the embodiments or the existing technology will be briefly described in the following. It is obvious that the described drawings are only related to some embodiments of the disclosure. Those skilled in the art can obtain other drawing(s) according to these drawings without any inventive work.

DETAILED DESCRIPTION

Figure 1A:
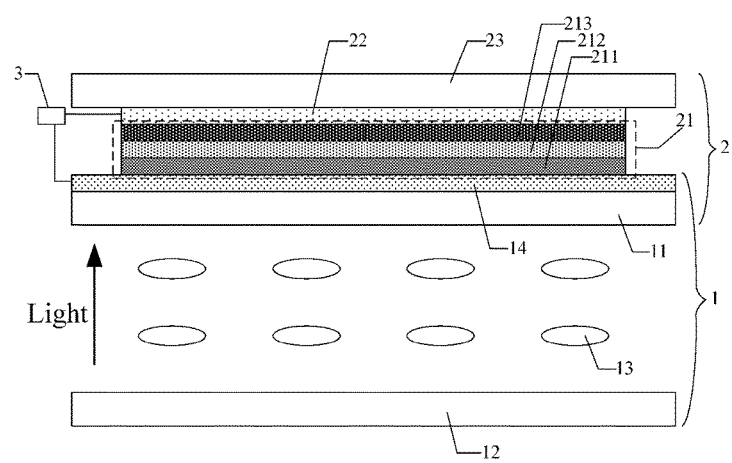
FIGS. 1A-1E are multiple schematic views illustrating structures of display devices provided by embodiments of the present disclosure, respectively.

The technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Embodiments of a display device, a manufacturing method thereof, a driving method thereof and a display apparatus provided by embodiments of the present disclosure will be described in details below in connection with the drawings.

The shape and thickness of each film layer in the drawings do not reflect their actual scale, and the purpose is merely to schematically illustrate contents of the present disclosure.

To enable an existing display device to achieve personalized features, an electrochromic device may be attached to a light exiting side of a display panel. However, this may cause an overall thickness of the display device to be relatively thick. Thus, how to reduce an overall thickness of a display device on the premise of enabling the display device with personalized features is a technical problem that needs to be solved. According to embodiments of the present disclosure, there are provided a display device, a manufacturing method thereof, a driving method thereof and a display apparatus, which can reduce the overall thickness of the display device on the premise of ensuring that the display device has personalized features.

A display device provided by embodiments of the present disclosure, as shown in FIGS. 1A-1E, includes a display panel 1 and an electrochromic device 2 located on a light exiting side of the display panel 1. The electrochromic device 2 and the display panel 1 share a first base substrate and a first transparent electrode in the display panel 1 in common, where the first base substrate and the first transparent electrode in the display panel 1 are closest to a light exiting side of the display panel 1. For example, the first base substrate in the display panel 1 is close to the light exiting side of the display panel 1 when compared to another base substrate (e.g., an array substrate 12 in FIG. 1A) in the display panel 1; and the first transparent electrode in the display panel 1 is close to the light exiting side of the display panel 1 when compared to other electrodes (e.g., electrodes provided on the array substrate 12, not shown in the figures) in the display panel 1.

With respect to the display device provided by embodiments of the present disclosure, due to the fact that the electrochromic device and the display panel share a first base substrate and a first transparent electrode of the display panel that are close to a light exiting side of the display panel, not only a base substrate can be saved, but also a manufacturing procedure of a transparent electrode can be saved. Consequently, it is possible that an overall thickness of the display device is reduced, the manufacturing process of the display device is simplified, and the manufacturing cost of the display device is reduced. Furthermore, because there is no need to apply voltage signals to a first transparent electrode and a second transparent electrode any more after an electrochromic structure in the electrochromic device changes color, there is no power consumption during a process when the display device maintains a personalized color or pattern. Thus, the power consumption of the display device can be reduced as well.

For example, the display device provided by embodiments of the present disclosure may be applied in Liquid Crystal Displays (LCDs); or, the display device provided by embodiments of the present disclosure may also be applied in Organic Light Emitting Diode (OLEDs). The present disclosure does not place any limitation here.

Figure 1B:
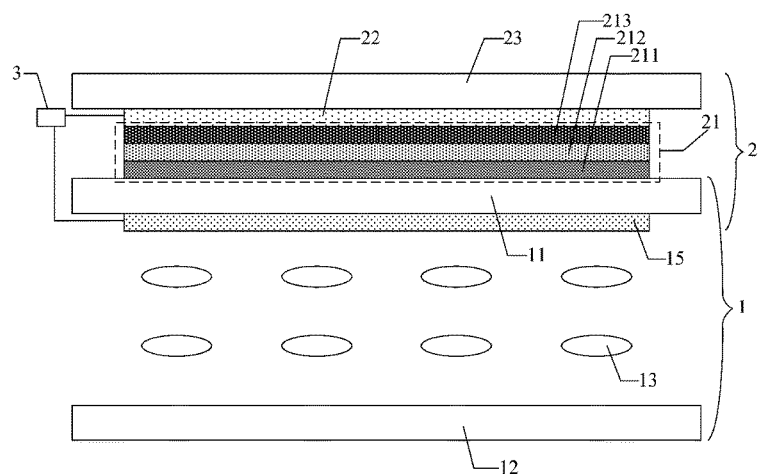
Figure 1C:
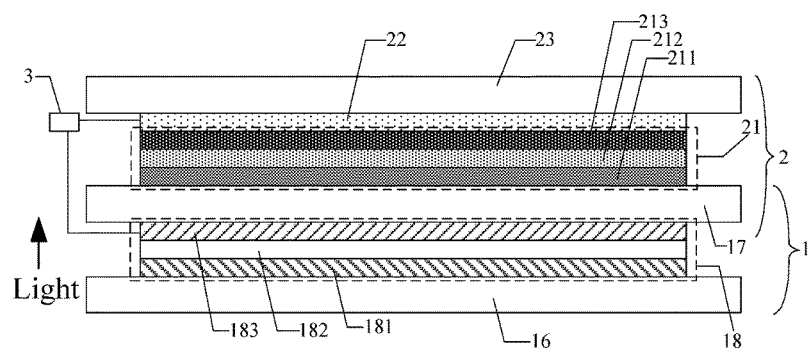
Figure 1D:
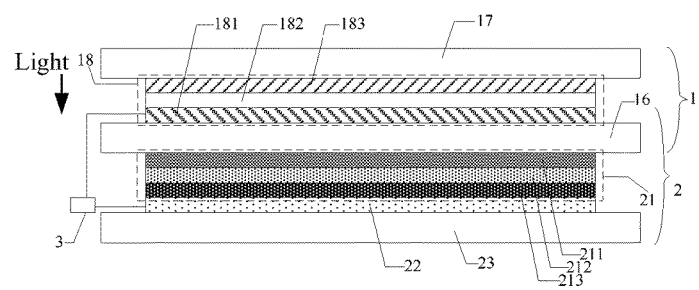
Figure 1E:
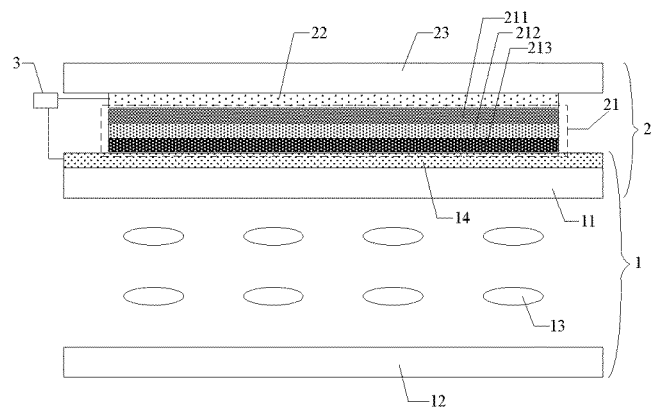

For example, when the display device provided by embodiments of the present disclosure is applied in LCDs, as shown in FIG. 1A, FIG. 1B and FIG. 1E, the display panel 1 may include: a counter substrate 11 and an array substrate 12 that are disposed opposite to each other, and a liquid crystal layer 13 provided between the counter substrate 11 and the array substrate 12. A first base substrate in the display panel 1 that is close to a light exiting side of the display panel 1 is the counter substrate 11. For example, the counter substrate 11 is located at the light exiting side of the display panel 1, and is closer to the light existing side of the display panel 1 comparing to the array substrate 12 of the display panel 1. In some examples, as shown in FIG. 1A, the display device provided by embodiments of the present disclosure may be applied in Advanced Super Dimension Switch (ADS) mode LCDs and In-Plane Switch (IPS) mode LCDs; that is, a common electrode is located on a side of an array substrate 12 that faces the counter substrate 11. In these cases, a shielding electrode 14 can be provided on a side of the counter substrate 11 that is away from the array substrate 12, so as to avoid interference to the LCD caused by external signals. For example, the counter substrate 11 includes a side that is away from the array substrate 12 and another side that faces the array substrate 12. Thus, a first transparent electrode in the display panel 1 that is close to the light exiting side of the display panel 1 is the shielding electrode 14 located on the side of the counter substrate 11 that is away from the array substrate 12. For example, the shielding electrode 14 is located at the light existing side of the display panel 1, and is closer to the light existing side of the display panel 1 comparing to the common electrode provided on the array substrate 12. Or, as shown in FIG. 1B, the display device provided by embodiments of the present disclosure may also be applied in Twisted Nematic (TN) mode LCDs; that is, a common electrode 15 is located on a side of the counter substrate 11 that faces the array substrate 12; and therefore, a first transparent electrode in the display panel 1 that is close to the light exiting side of the display panel 1 is the common electrode 15 located on the side of the counter substrate 11 that faces the array substrate 12.

In another example, when the display device provided by embodiments of the present disclosure is applied in OLEDs, as shown in FIG. 1C and FIG. 1D, the display panel 1 may include: a third base substrate 16 and a packaging cover plate 17 that are disposed opposite to each other, and an organic electroluminescent structure 18 located between the third base substrate 16 and the packaging cover plate 17. The organic electroluminescent structure 18 generally includes an anode 181, a luminescent layer 182 and a cathode 183 that are sequentially stacked on the third base substrate 16. In some examples, as shown in FIG. 1C, the display device provided by embodiments of the present disclosure may be applied in top-emission OLEDs; and therefore, a first base substrate in the display panel 1 that is close to a light exiting side of the display panel 1 is the packaging cover plate 17, and a first transparent electrode in the display panel 1 that is close the light exiting side of the display panel 1 is the cathode 183 in the organic electroluminescent structure 18. For example, in FIG. 1C, the packaging cover plate 17 is located at the light existing side of the display panel 1, and is closer to the light existing side of the display panel 1 comparing to the third base substrate 16; and the cathode 183 in the organic electroluminescent structure 18 is closer to the light exiting side of the display panel 1 comparing to the anode 181 in the organic electroluminescent structure 18. Or, as shown in FIG. 1D, the display device provided by embodiments of the present disclosure may be applied in bottom-emission OLEDs; and therefore, a first base substrate in the display panel 1 that is close to the light exiting side of the display panel 1 is the third base substrate 16, and a first transparent electrode in the display panel 1 that is close to the light exiting side of the display panel 1 is the anode 181 in the organic electroluminescent structure 18. For example, in FIG. 1D, the third base substrate 16 is located at the light existing side of the display panel 1, and is closer to the light existing side of the display panel 1 comparing to the packaging cover plate 17; and the anode 181 in the organic electroluminescent structure 18 is closer to the light exiting side of the display panel 1 comparing to the cathode 183 in the organic electroluminescent structure 18.

For example, in the display device provided by embodiments of the present disclosure, as shown in FIGS. 1A-1E, the electrochromic device 2 may include: an electrochromic structure 21, a second transparent electrode 22 and a second base substrate 23 that are sequentially stacked on the display panel 1. As such, application of voltage signals to the first transparent electrode (e.g., the shielding electrode 14 in FIG. 1A, the common electrode 15 in FIG. 1B, the cathode 183 in FIG. 1C, the anode 181 in FIG. 1D or the shielding electrode 14 in FIG. 1E) and the second transparent electrode 22 may cause the electrochromic structure 21 to change color, while application of reverse voltage signals to the first transparent electrode and the second transparent electrode 22 may restore the electrochromic structure 21 to be transparent.

For example, the display device provided by embodiments of the present disclosure, as shown in FIGS. 1A-1E, may further include a driving circuit 3 for driving the electrochromic device 2. The first transparent electrode (e.g., the shielding electrode 14 in FIG. 1A, the common electrode 15 in FIG. 1B, the cathode 183 in FIG. 1C, the anode 181 in FIG. 1D or the shielding electrode 14 in FIG. 1E) and the second transparent electrode 22 are electrically connected to the driving circuit 3. It is to be noted herein that, a structure of the driving circuit 3 for driving the display panel 1 may be similar to that of an existing driving circuit, and related details are not repeated here. The display device provided by embodiments of the present disclosure can independently drive the electrochromic device 2 and the display panel 1. For example, when the display panel 1 is in a non-display state, the driving circuit 3 can apply first voltage signals to the first transparent electrode (e.g., the shielding electrode 14 in FIG. 1A, the common electrode 15 in FIG. 1B, the cathode 183 in FIG. 1C, the anode 181 in FIG. 1D or the shielding electrode 14 in FIG. 1E) and the second transparent electrode 22, which causes the electrochromic structure 21 to change color. Thus, the electrochromic device 2 may show a certain color to enable the display device to achieve personalized display features. Before the display panel 1 turns into a display state, the driving circuit 3 may apply reverse voltage signals to the first transparent electrode and the second transparent electrode 22 to cause the electrochromic structure 21 to become transparent. Thus, the electrochromic device 2 may show a transparent color, and a normal display of the display device may not be affected. The reverse voltage signals may be voltage signals reverse to the first voltage signals, respectively.

For example, in the display device provided by embodiments of the present disclosure, as shown in FIGS. 1A-1E, the electrochromic structure 21 may be a planar structure disposed on a whole surface. As shown in FIGS. 1A-1D, the electrochromic structure 21 may include an ion storage layer 211, an electrolyte layer 212 and an electrochromic layer 23 that are sequentially stacked on the display panel 1. Or, as shown in FIG. 1E, the electrochromic structure 21 may include an electrochromic layer 213, an electrolyte layer 212 and an ion storage layer 211 that are sequentially stacked on the display panel 1, and no limitation is placed here. The first transparent electrode (e.g., the shielding electrode 14 in FIG. 1A, the common electrode 15 in FIG. 1B, the cathode 183 in FIG. 1C, the anode 181 in FIG. 1D or the shielding electrode 14 in FIG. 1E) and the second transparent electrode 22 may also be planar electrodes disposed on a whole surface. In this way, the driving circuit 3 can apply voltage signals to the whole first transparent electrode and the whole second transparent electrode, to cause the whole electrochromic structure 21 to change color or become transparent. Thus, the whole electrochromic device 2 shows a certain color or becomes transparent, and the driving circuit 3 cannot drive the electrochromic device 2 to show a certain pattern.

Figure 2A:
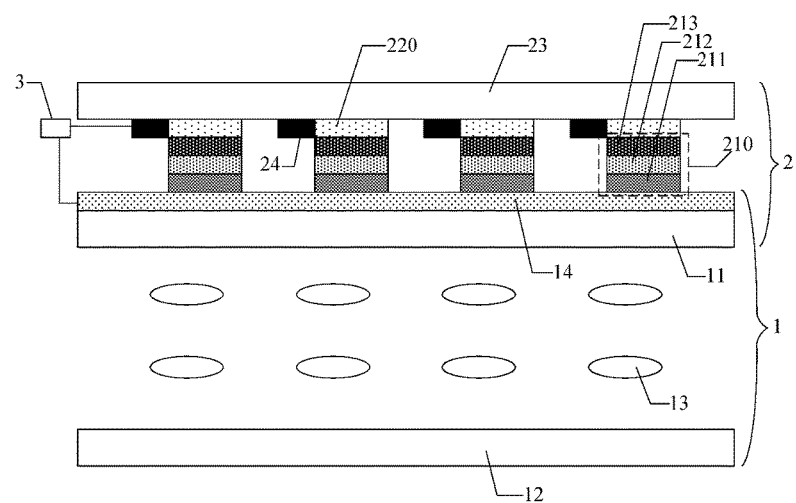
FIG. 2A and FIG. 2B are additional schematic views illustrating structures of display devices provided by embodiments of the present disclosure, respectively.
Figure 2B:
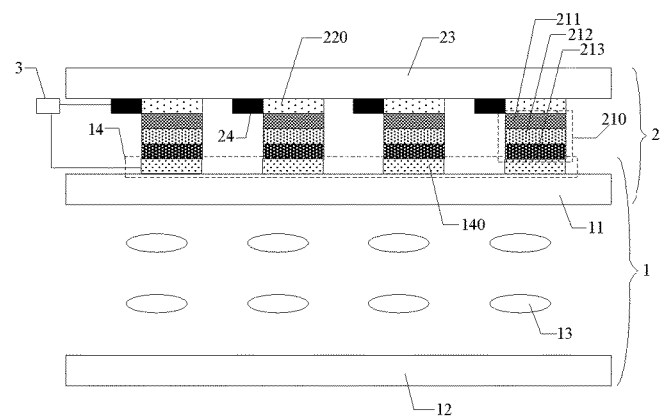
Figure 3:
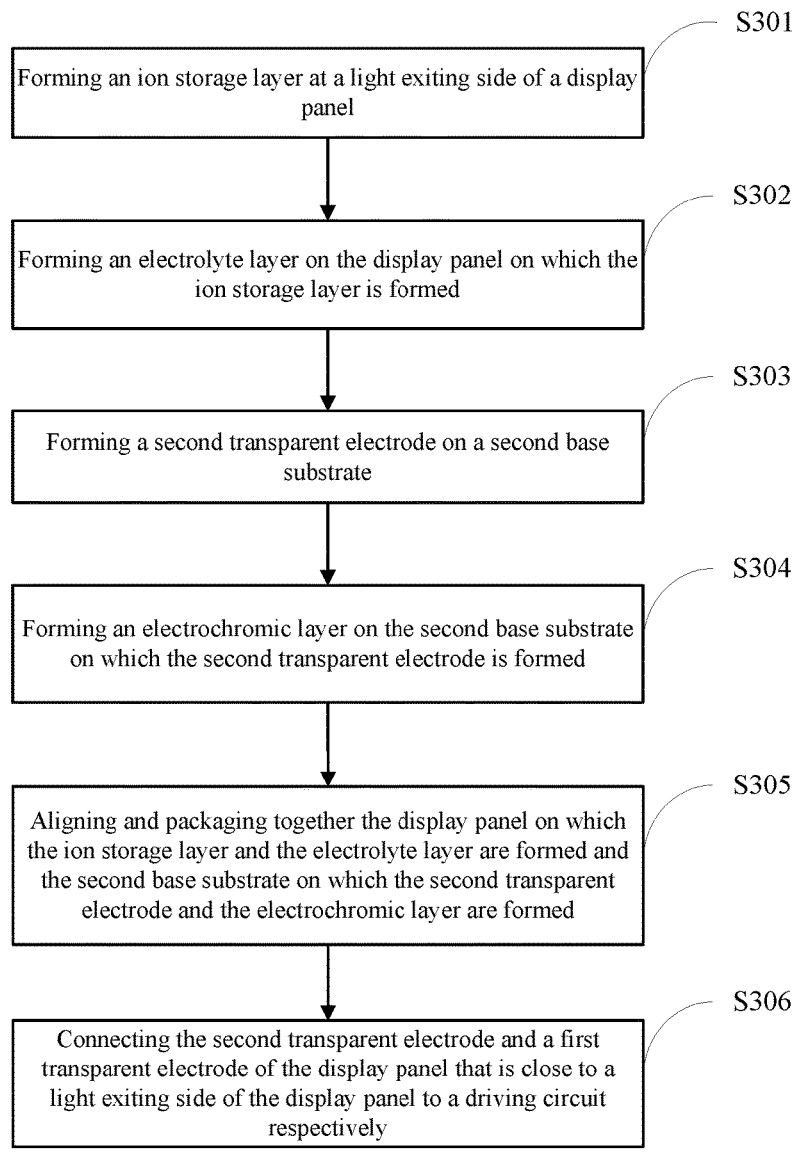
FIG. 3 is a flowchart diagram illustrating a manufacturing method of a display device provided by an embodiment of the present disclosure.

In another example, in the display device provided by embodiments of the present disclosure, as shown in FIG. 2A and FIG. 2B (description being provided with reference to an example application in ADS mode LCDs), an electrochromic structure 21 may include a plurality of electrochromic substructures 210 arranged in a form of a matrix; a second transparent electrode 22 may include a plurality of second transparent sub-electrodes 220 that correspond to the electrochromic substructures 210 on a one-to-one basis; the electrochromic device 2 may further include thin film transistors 24 that correspond to and are electrically connected to the second transparent sub-electrodes 220 on a one-to-one basis, where the driving circuit 3 is electrically connected to the respective second transparent sub-electrodes 220 via corresponding thin film transistors 24, respectively. As shown in FIG. 2A and FIG. 2B, the driving circuit 3 can drive each of the second transparent sub-electrodes 220 via a corresponding thin film transistor 24, respectively. The driving circuit 3 can drive part of the electrochromic substructures 210 to change color, so that the electrochromic device 2 shows a certain pattern. Or, the driving circuit 3 may drive all of the electrochromic substructures 210 to change color, so that the electrochromic device 2 shows a certain color. For example, when the display panel 1 is in a non-display state, the driving circuit 3 can apply a voltage signal to a first transparent electrode (e.g., a shielding electrode 14 in FIG. 2A and FIG. 2B) and can also apply voltage signals to the second transparent sub-electrodes 220 via corresponding thin film transistors 24, to drive the electrochromic device 2 to show a certain color or pattern, thereby enabling the display device to accomplish personalized display features. Before the display panel 1 turns into a display state, the driving circuit 3 can apply another voltage signal to the first transparent electrode (e.g., the shielding electrode 14 in FIG. 2A and FIG. 2B), and can also apply other voltage signals to corresponding second transparent sub-electrodes 220 via corresponding thin film transistors 24, causing the electrochromic device 2 to show a transparent color in a display region of the display panel 1 and to show a certain color or pattern in a frame region of the display panel 1. In this way, the normal display of the display device will not be affected, and the display device can accomplish personalized display features as well.

It is to be noted that, in the display device provided by embodiments of the present disclosure, as shown in FIG. 2A and FIG. 2B, the electrochromic structure 21 includes a plurality of electrochromic substructures 210 arranged in the form of a matrix, and the second transparent electrode 22 includes a plurality of second transparent sub-electrodes 220 that correspond to the electrochromic substructures 210 on a one-to-one basis. As shown in FIG. 2A, the first transparent electrode (e.g., the shielding electrode 14 in FIG. 2A) may be a planar electrode disposed on a whole surface. Or, as shown in FIG. 2B, the first transparent electrode (e.g., the shielding electrode 14) includes a plurality of first transparent sub-electrodes 140, and thus, the first transparent electrode may include a plurality of first transparent sub-electrodes 140 that correspond to the second transparent sub-electrodes 220 on a one-to-one basis. The present disclosure does not place any limitation here.

For example, in the display device provided by embodiments of the present disclosure, as shown in FIG. 2A, each of the electrochromic substructures 210 may include: an ion storage layer 211, an electrolyte layer 212 and an electrochromic layer 213 that are stacked on the display panel 1 in sequence. Or, each of the electrochromic substructures, as shown in FIG. 2B, may include: an electrochromic layer 213, an electrolyte layer 212 and an ion storage layer 211 that are sequentially stacked on the display panel 1. The present disclosure does not place any limitation here.

According to an embodiment of the present disclosure, there is further provided with a display apparatus, which includes any of the above-described display devices provided by embodiments of the present disclosure. The display apparatus may be a cell phone, a tablet computer, a television, a display, a notebook computer, a digital photo frame, a navigator or any other product or component having a display function. Implementation of the display apparatus may be performed with reference to embodiments of the above-described display devices, and similar description will not be repeated here.

Based on the above-described display devices provided by embodiments of the present disclosure, there is further provided with a manufacturing method of a display device according to embodiments of the present disclosure. The manufacturing method includes:

forming an electrochromic device at a light exiting side of a display panel, where the electrochromic device and the display panel share a first base substrate and a first transparent electrode of the display panel that are close to the light exiting side of the display panel.

Figure 4A:
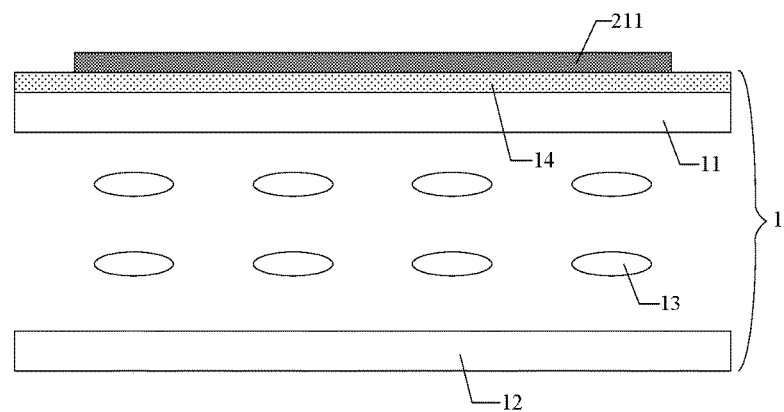
FIGS. 4A-4E are schematic views of structures of a display device after execution of respective steps of a manufacturing method provided by an embodiment of the present disclosure, respectively.

For example, in the above method provided by embodiments of the present disclosure, descriptions will be provided with reference to an example in which a display device shown in FIG. 1A is formed. As shown in FIG. 3 and FIGS. 4A-4E, forming an electrochromic device at a light exiting side of a display panel may include the following steps:

Step S301: forming an ion storage layer 211 at a light exiting side of a display panel, as shown in FIG. 4A. For example, an ion storage layer 211 may be formed by ways of spin-coating, and a baking treatment may be performed on the ion storage layer 211 after formation of the ion storage layer 211.

Figure 4B:
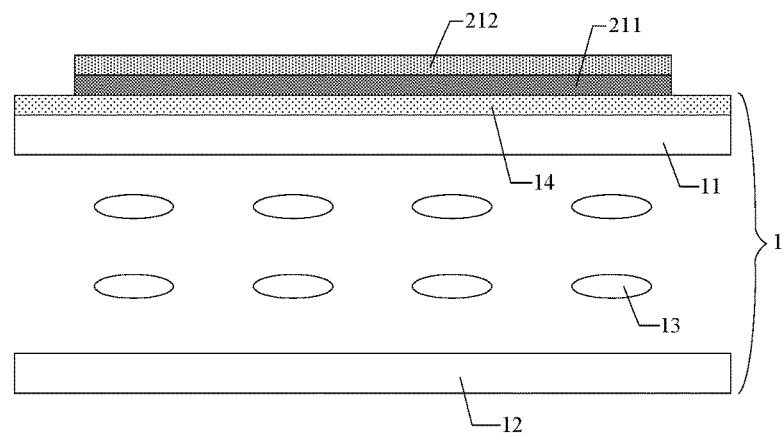

Step S302: forming an electrolyte layer 212 on the display panel 1 on which the ion storage layer 211 is formed, as shown in FIG. 4B. For example, an electrolyte layer 212 may be formed by ways of coating with a polymer electrolyte sol solution.

Figure 4C:
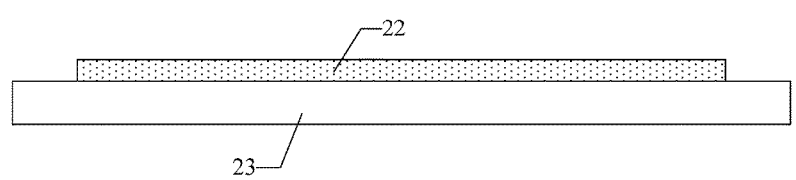

Step S303: forming a second transparent electrode 22 on a second base substrate 23, as shown in FIG. 4C. For example, material of the second transparent electrode 22 may be a transparent conductive oxide material, such as Indium Tin Oxides (ITO).

Figure 4D:
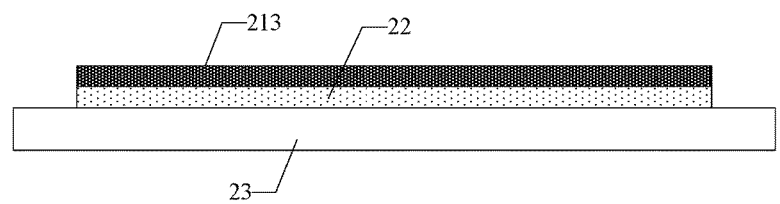

Step S304: forming an electrochromic layer 213 on the second base substrate 23 on which the second transparent electrode 22 is formed, as shown in FIG. 4D. For example, an electrochromic layer 213 may be formed by ways of spin-coating, and a baking treatment may be performed on the electrtochromic layer 213 after formation of the electrochromic layer 213.

Figure 4E:
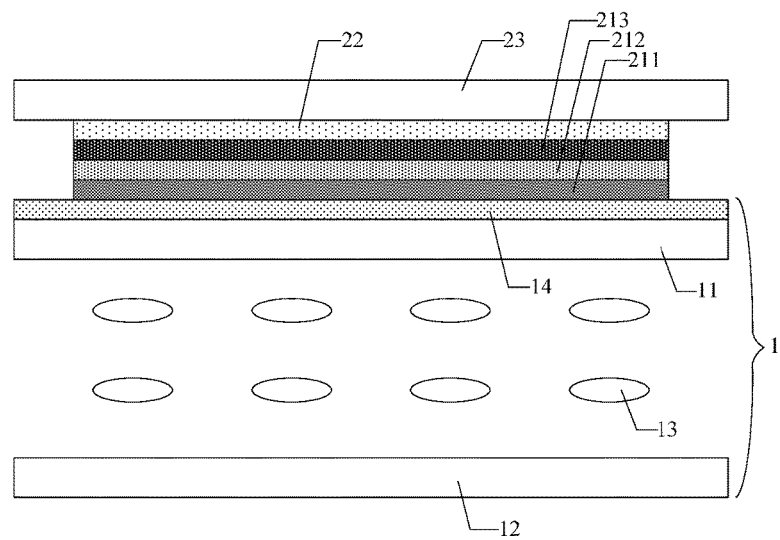
Figure 5:
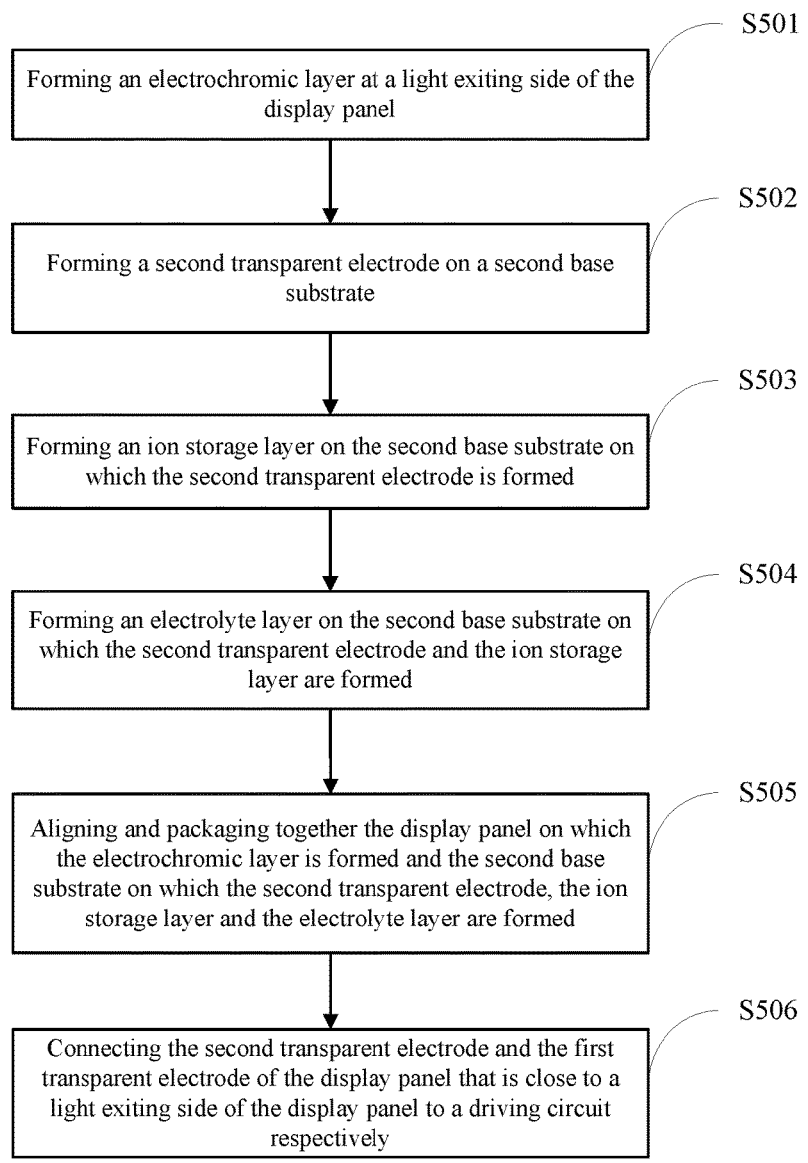
FIG. 5 is another flowchart diagram illustrating a manufacturing method of a display device provided by an embodiment of the present disclosure.

Step S305: aligning and packaging together the display panel 1 on which the ion storage layer 211 and the electrolyte layer 212 are formed and the second base substrate 23 on which the second transparent electrode 22 and the electrochromic layer 213 are formed, as shown in FIG. 4E;

Step S306: connecting the second transparent electrode 22 and a first transparent electrode (e.g., a shielding electrode 14 in FIG. 1A) of the display panel 1 that is close to a light exiting side of the display panel 1 to a driving circuit 3 respectively, as shown in FIG. 1A.

Figure 6A:
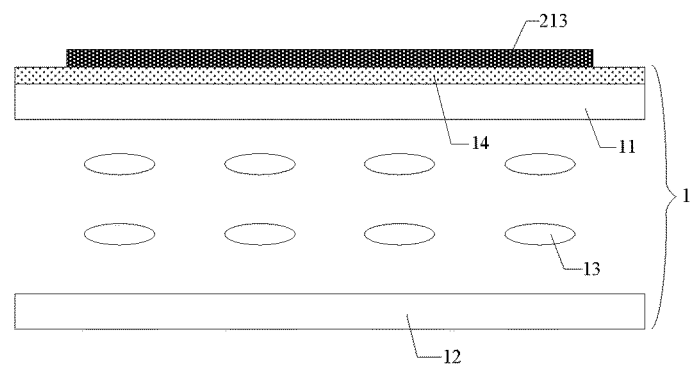
FIGS. 6A-6F are additional schematic views of structures of a display device after execution of respective steps of a manufacturing method provided by an embodiment of the present disclosure, respectively.
Figure 6B:
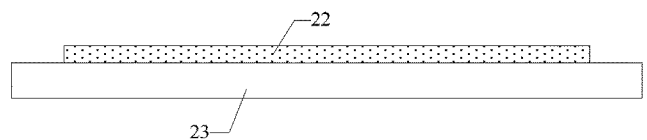
Figure 6C:
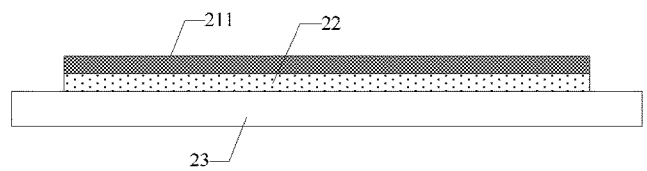
Figure 6D:
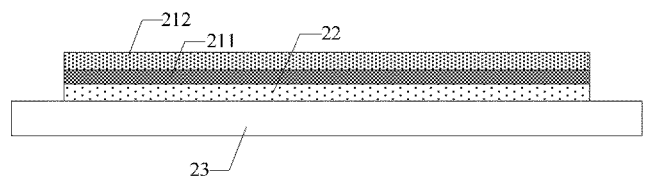
Figure 6E:
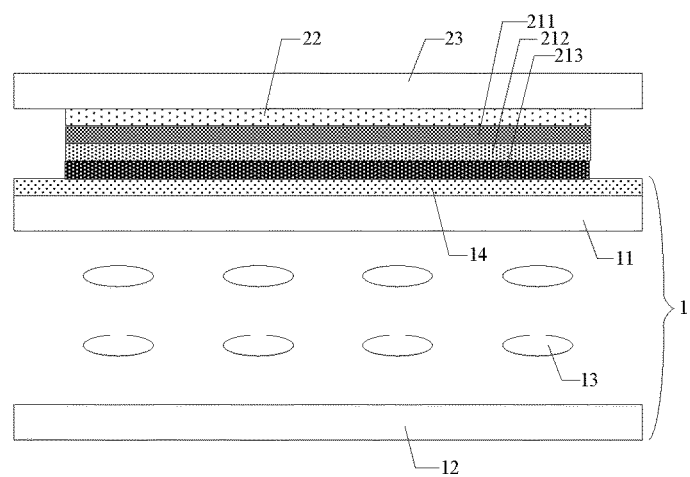
Figure 6F:
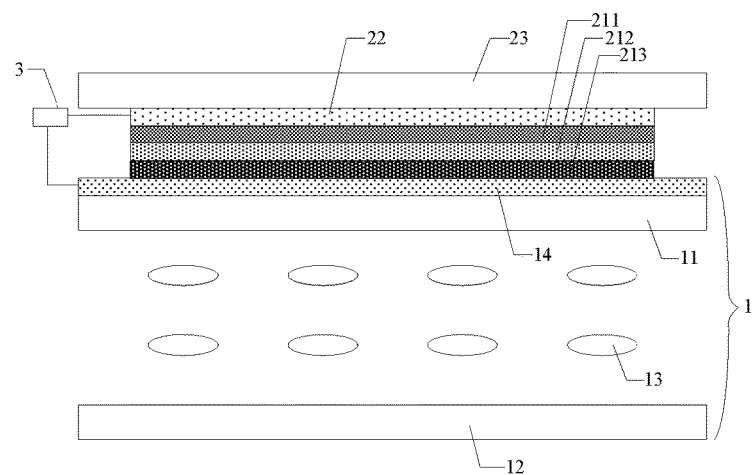

In another example, in the above method provided by embodiments of the present disclosure, forming an electrochromic device at a light exiting side of a display panel, as shown in FIG. 5 and FIGS. 6A-6F, may include the following steps:

Step S501: forming an electrochromic layer 213 at a light exiting side of the display panel 1, as shown in FIG. 6A;

Step S502: forming a second transparent electrode 22 on a second base substrate 23, as shown in FIG. 6B;

Step S503: forming an ion storage layer 211 on the second base substrate 23 on which the second transparent electrode 22 is formed, as shown in FIG. 6C;

Step S504: forming an electrolyte layer 212 on the second base substrate 23 on which the second transparent electrode 22 and the ion storage layer 211 are formed, as shown in FIG. 6D;

Step S505: aligning and packaging together the display panel 1 on which the electrochromic layer 213 is formed and the second base substrate 23 on which the second transparent electrode 22, the ion storage layer 211 and the electrolyte layer 212 are formed, as shown in FIG. 6E;

Step S506: connecting the second transparent electrode 22 and the first transparent electrode (e.g., a shielding electrode 14 in FIG. 6F) of the display panel 1 that is close to a light exiting side of the display panel to a driving circuit 3 respectively, as shown in FIG. 6F.

Implementation of the manufacturing method of the above display device provided by embodiments of the present disclosure may be performed with reference to embodiments of the above display device, and similar description will not be repeated here.

Based on the above display device provided by embodiments of the present disclosure, there is further provided with a driving method of a display device according to embodiments of the present disclosure. The driving method includes:

when a display panel is in a display state, applying different voltage signals to a second transparent electrode in an electrochromic device and a first transparent electrode of the display panel that is close to a light exiting side of the display panel, so that the electrochromic device shows a transparent color at least in a display region of the display panel and a normal display of the display device will not be affected; and when the display panel is in a non-display state, applying different voltage signals to the second transparent electrode in the electrochromic device and the first transparent electrode of the display panel that is close to the light exiting side of the display panel, so that an image or a pattern can be displayed by the electrochromic device and thus the display device can achieve personalized display features.

For example, in the above-described method provided by embodiments of the present disclosure, when the display panel is in a display state, the electrochromic device showing a transparent color at least in a display region of the display panel may includes:

the electrochromic device shows a transparent color in the display region of the display panel, and the electrochromic device displays images in a frame region of the display panel (e.g., the electrochromic device displays a certain color or pattern in the frame region of the display panel). Thus, the electrochromic device will not affect the normal display of the display device and may also enable the display device to display with personalized features. Furthermore, when the display panel is in a non-display state, the electrochromic device may display a certain color or pattern; and thus, the display device can achieve personalized display features.

Of course, in the above-described method provided by embodiments of the present disclosure, when the display panel is in a display state, the electrochromic device shows a transparent color at least in a display region of the display panel, or the whole electrochromic device shows a transparent color. Thus, the normal display of the display device will not be affected by the electrochromic device. When the display panel is in a non-display state, the electrochromic device may show a certain color or pattern, and thus, the display device can achieve display with personalized features. The present disclosure does not place any limitation here.

Implementation of the driving method of the above-described display device provided by embodiments of the present disclosure may be accomplished with reference to embodiments of the above-described display device, and similar description will not be repeated here.

A display device, a manufacturing method thereof, a driving method thereof and a display apparatus are provided in embodiments of the present disclosure. The display device includes a display panel and an electrochromic device located on a light exiting side of the display panel. Due to the fact that the electrochromic device and the display panel share a first base substrate and a first transparent electrode of the display panel that are close to a light exiting side of the display panel in common, not only a base substrate can be saved, but also a manufacturing procedure of a transparent electrode can be saved. Consequently, it is possible that an overall thickness of the display device is reduced, the manufacturing process of the display device is simplified, and the manufacturing cost of the display device is reduced. Furthermore, because there is no need to apply voltage signals to a first transparent electrode and a second transparent electrode any more after an electrochromic structure in the electrochromic device changes color, there is no power consumption during a process when the display device maintains a personalized color or pattern. Thus, the power consumption of the display device can be reduced as well.

It's to be noted that, in the drawings, for the clarity of the drawings the sizes of layers and areas may be exaggerated. And it can be understood, in the case that a component or a layer called "on" another element or layer, it can be directly on the top of the other elements, or can exist in the middle layer. Besides, it can be understood that, in the case that a component or a layer called "under" another element or layer, it can be directly under the other components, or there are at least two intermediate layers or elements. Besides, it can also be understood that, in the case that a layer or a component called "between" two layers or two elements, it can be the only layer of the two layers or two components, or it also exists at least two intermediate layers or elements. The similar reference marks indicate similar components in the whole text.

In the present disclosure, the terms "the first", "the second", "the third" only used to describe the purpose, and can not be understood as instructions or suggestions of relative importance. The term "a plurality of" refers to two or more than two, unless expressly limited.

What are described above is related to the illustrative embodiments of the disclosure only and not limitative to the scope of the disclosure; any changes or replacements easily for those technical personnel who are familiar with this technology in the field to envisage in the scopes of the disclosure, should be in the scope of protection of the present disclosure. Therefore, the scopes of the disclosure are defined by the accompanying claims.

The present application claims the priority of the Chinese Patent Application No. 201510272138.1 filed on May 25, 2015, which is incorporated herein by reference in its entirety as part of the disclosure of the present application.

The invention claimed is:

1. A display device, comprising:
a display panel; and
an electrochromic device located on a light exiting side of the display panel;
wherein the electrochromic device and the display panel share a first base substrate and a first transparent electrode in the display panel that are close to the light exiting side of the display panel;
wherein the electrochromic device includes an electrochromic structure, a second transparent electrode and a second base substrate that are sequentially stacked on the display panel;
a driving circuit for driving the electrochromic device, wherein the first transparent electrode and the second transparent electrode are electrically connected to the driving circuit, respectively;
wherein:
the electrochromic structure includes a plurality of electrochromic substructures arranged in a form of a matrix;
the second transparent electrode includes a plurality of second transparent sub-electrodes that correspond to the electrochromic substructures on a one-to-one basis;
the electrochromic device further includes thin film transistors that correspond to and are electrically connected to the second transparent sub-electrodes on a one-to-one basis; and
the driving circuit is electrically connected to the second transparent sub-electrodes via corresponding thin film transistors, respectively.

2. The display device of claim 1, wherein: each of the electrochromic substructures includes an electrochromic layer, an electrolyte layer and an ion storage layer that are sequentially stacked on the display panel; or, each of the electrochromic substructures includes an ion storage layer, an electrolyte layer and an electrochromic layer that are sequentially stacked on the display panel.

3. A display apparatus, comprising the display device of claim 1.

4. A manufacturing method of the display device of claim 1, comprising:
forming the electrochromic device at the light exiting side of the display panel;
wherein the electrochromic device and the display panel share the first base substrate and the first transparent electrode in the display panel that are close to the light exiting side of the display panel.

5. The method of claim 4, wherein forming the electrochromic device at the light exiting side of the display panel includes:
Forming an ion storage layer at the light exiting side of the display panel;
forming an electrolyte layer on the display panel on which the ion storage layer is formed;
forming a second transparent electrode on a second base substrate;
forming an electrochromic layer on the second base substrate on which the second transparent electrode is formed;
performing cell alignment and packaging on the display panel on which the ion storage layer and the electrolyte layer are formed and the second base substrate on which the second transparent electrode and the electrochromic layer are formed; and
connecting the second transparent electrode and the first transparent electrode in the display panel that is close to the light exiting side of the display panel to a driving circuit, respectively.

6. The method of claim 4, wherein forming the electrochromic device at the light exiting side of the display panel includes:

forming an electrochromic layer at the light exiting side of the display panel;

forming a second transparent electrode on a second base substrate;

forming an ion storage layer on the second base substrate on which the second transparent electrode is formed;

forming an electrolyte layer on the second base substrate on which the second transparent electrode and the ion storage layer are formed;

performing cell alignment and packaging on the display panel on which the electrochromic layer is formed and the second base substrate on which the second transparent electrode, the ion storage layer and the electrolyte layer are formed; and connecting the second transparent electrode and the first transparent electrode in the display panel that is close to the light exiting side of the display panel to a driving circuit, respectively.

7. A driving method of the display device of claim 1, comprising:

when the display panel is in a display state, applying different voltage signals to a second transparent electrode in the electrochromic device and the first transparent electrode in the display panel that is close to the light exiting side of the display panel to configure the electrochromic device to show a transparent color at least in a display region of the display panel; and when the display panel is in a non-display state, applying different voltage signals to the second transparent electrode in the electrochromic device and the first transparent electrode in the display panel that is close to the light exiting side of the display panel to configure the electrochromic device to display an image.

8. The method of claim 7, wherein the electrochromic device showing the transparent color at least in the display region of the display panel includes:

the electrochromic device showing the transparent color in the display region of the display panel, and the electrochromic device displaying an image in a frame region of the display panel.

9. The display device of claim 1, wherein:

the display panel includes a counter substrate and an array substrate that are disposed opposite to each other and a liquid crystal layer located between the counter substrate and the array substrate;

the first base substrate is the counter substrate; and the first transparent electrode is a shielding electrode located on a side of the counter substrate that is away from the array substrate, or the first transparent electrode is a common electrode located on another side of the counter substrate that faces the array substrate.

10. The display device of claim 1, wherein:

the display panel includes a third base substrate and a packaging cover plate that are disposed opposite to each other and an organic electroluminescent structure located between the third base substrate and the packaging cover plate;

the first base substrate is the packaging cover plate, and the first transparent electrode is a cathode in the organic electroluminescent structure; or, the first base substrate is the third base substrate, and the first transparent electrode is an anode in the organic electroluminescent structure.

11. The manufacturing method of the display device of claim 1, comprising:

forming the electrochromic device at the light exiting side of the display panel;

wherein the electrochromic device and the display panel share the first base substrate and the first transparent electrode in the display panel that are close to the light exiting side of the display panel.

12. The driving method of the display device of claim 1, comprising:

when the display panel is in a display state, applying different voltage signals to a second transparent electrode in the electrochromic device and the first transparent electrode in the display panel that is close to the light exiting side of the display panel to configure the electrochromic device to show a transparent color at least in a display region of the display panel; and when the display panel is in a non-display state, applying different voltage signals to the second transparent electrode in the electrochromic device and the first transparent electrode in the display panel that is close to the light exiting side of the display panel to configure the electrochromic device to display an image.

13. The display device of claim 1, wherein:

the display panel includes a counter substrate and an array substrate that are disposed opposite to each other and a liquid crystal layer located between the counter substrate and the array substrate;

the first base substrate is the counter substrate; and the first transparent electrode is a shielding electrode located on a side of the counter substrate that is away from the array substrate, or the first transparent electrode is a common electrode located on another side of the counter substrate that faces the array substrate.

14. The display device of claim 1, wherein:

the display panel includes a third base substrate and a packaging cover plate that are disposed opposite to each other and an organic electroluminescent structure located between the third base substrate and the packaging cover plate;

the first base substrate is the packaging cover plate, and the first transparent electrode is a cathode in the organic electroluminescent structure; or, the first base substrate is the third base substrate, and the first transparent electrode is an anode in the organic electroluminescent structure.

15. The manufacturing method of the display device of claim 1, comprising:

forming the electrochromic device at the light exiting side of the display panel;

wherein the electrochromic device and the display panel share the first base substrate and the first transparent electrode in the display panel that are close to the light exiting side of the display panel.

16. A display device, comprising:

a display panel; and an electrochromic device located on a light exiting side of the display panel;

wherein the electrochromic device and the display panel share a first base substrate and a first transparent electrode in the display panel that are close to the light exiting side of the display panel;

wherein:

the display panel includes a counter substrate and an array substrate that are disposed opposite to each other and a liquid crystal layer configured between the counter substrate and the array substrate;

the first base substrate is the counter substrate; and the first transparent electrode is a shielding electrode located on a side of the counter substrate that is away from the array substrate, or the first transparent electrode is a common electrode located on another side of the counter substrate that faces the array substrate.

17. A display device, comprising:
a display panel; and
an electrochromic device located on a light exiting side of the display panel;
wherein the electrochromic device and the display panel share a first base substrate and a first transparent electrode in the display panel that are close to the light exiting side of the display panel;
wherein:
the display panel includes a third base substrate and a packaging cover plate that are disposed opposite to each other and an organic electroluminescent structure located between the third base substrate and the packaging cover plate;
the first base substrate is the packaging cover plate and the first transparent electrode is a cathode in the organic electroluminescent structure; or
the first base substrate is the third base substrate and the first transparent electrode is an anode in the organic electroluminescent structure.

* * * * *